No. 857,945. PATENTED JUNE 25, 1907.
S. D. & H. T. LATTY.
JUVENILE HAND CAR.
APPLICATION FILED JUNE 15, 1906.
2 SHEETS—SHEET 1.
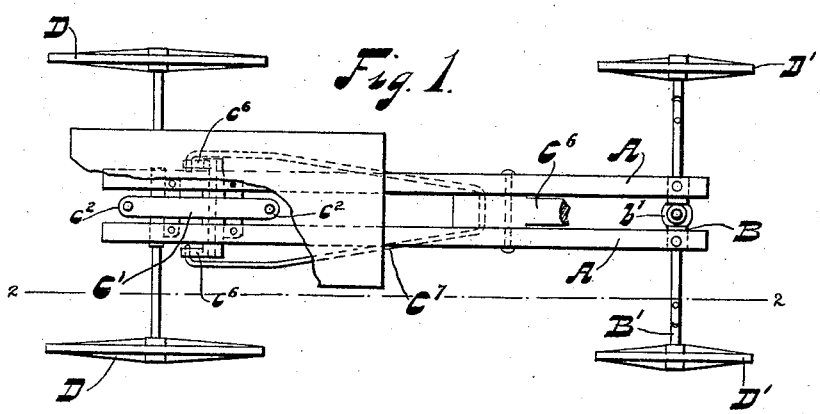
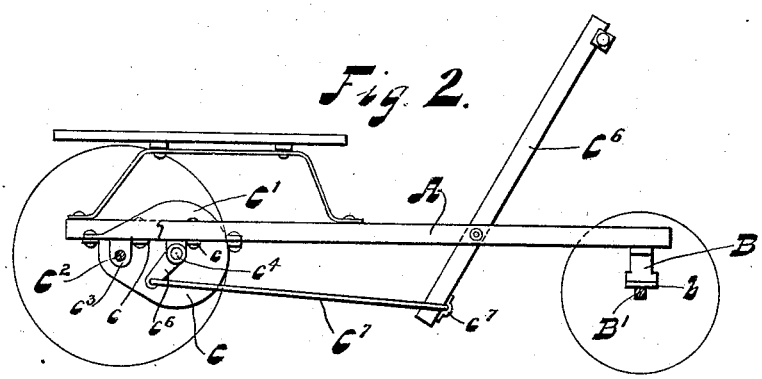
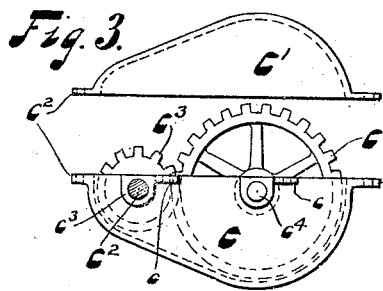
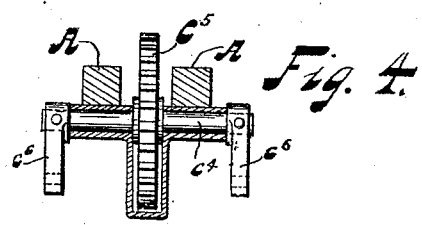
Witnesses:
Edw. Ludmueller.
Jno. F. Oberlin,
Inventors:
Samuel D. Latty & Henry T. Latty
By J. D. Fay
Their Attorney.

No. 857,945. PATENTED JUNE 25, 1907.
S. D. & H. T. LATTY.
JUVENILE HAND CAR.
APPLICATION FILED JUNE 15, 1906.
2 SHEETS—SHEET 2.
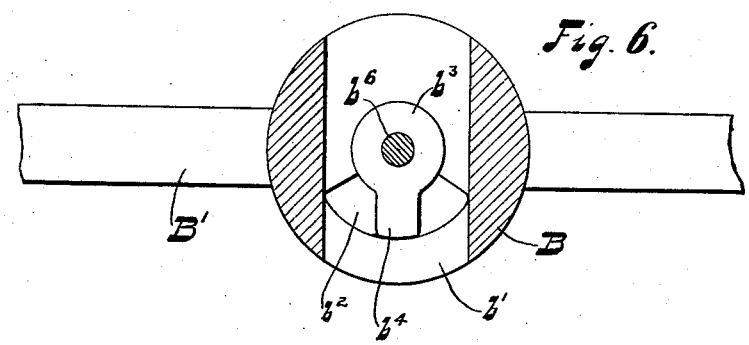
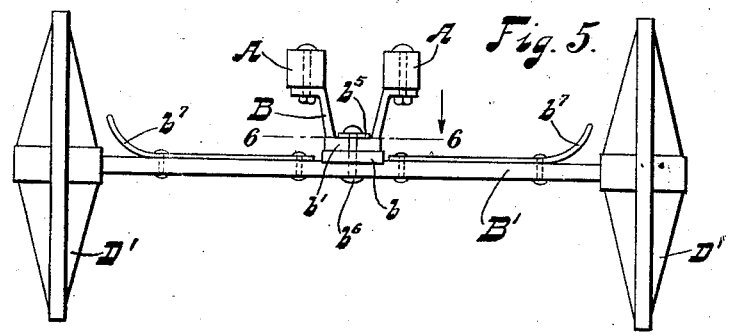
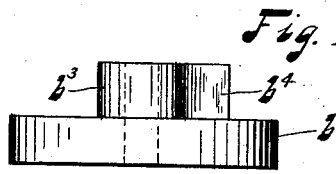
Witnesses:
Edw. Lindenmuller.
Jno. F. Oberlin.
Inventors:
Samuel D. Latty & Henry T. Latty.
By J. D. Fay
Their Attorney.

UNITED STATES PATENT OFFICE.

SAMUEL D. LATTY AND HENRY T. LATTY, OF CLEVELAND, OHIO.

JUVENILE HAND-CAR.

No. 857,945.  Specification of Letters Patent.  Patented June 25, 1907.

Application filed June 15, 1906. Serial No. 321,839.

*To all whom it may concern:*

Be it known that we, SAMUEL D. LATTY and HENRY T. LATTY, both citizens of the United States, and residents of Cleveland, county of Cuyahoga, and State of Ohio, have invented a new and useful Improvement in Juvenile Hand-Cars, of which the following is a specification, the principle of the invention being herein explained and the best mode in which we have contemplated applying that principle so as to distinguish it from other inventions.

Our invention relates to improvements in children's automobile vehicles, particularly in those of the hand-propelled type. In these the propelling mechanism usually comprises a lever, crank and gear, and one of the objects of our invention is the provision of improved means for supporting the gear in the vehicle frame, and for connecting the manually operable lever therewith.

Another object is the provision of a forward running gear construction whereby turning of the front truck into engagement with the vehicle body, so as to endanger overturning, is made impossible.

To the accomplishment of the above and allied ends, said invention consists of means hereinafter fully described and particularly set forth in the claims.

The annexed drawings and the following description set forth in detail certain mechanism embodying the invention, such disclosed means constituting but one of various mechanical forms in which the principle of the invention may be used.

In said annexed drawings: Figure 1 represents a plan view of a juvenile hand car embodying our several improvements, a portion of the seat of such car being broken away to better reveal the parts beneath; Fig. 2 is a longitudinal vertical cross-section of the same taken on the line 2—2, Fig. 1; Fig. 3 is a side elevation of the gear and gear casing forming a feature of such car; and Fig. 4 is a transverse vertical cross-section of such gear and gear casing. Fig. 5 is a front elevation of the forward running gear of said car; Fig. 6 is a horizontal cross-section on an enlarged scale of a portion of such gear; while Fig. 7 represents in side elevation one of the elements entering therein.

The frame-work of a vehicle of this sort is naturally quite simple, consisting merely of the two central, longitudinally-disposed coupling bars A, Figs. 1, 2 and 5. As may be readily observed from an inspection of the last of the figures just named, these bars are joined, and likewise supported, at their forward ends by means of a bolster B of U-shape. This bolster is supported upon the front truck or axle in a manner to be more particularly set forth later. At their rear ends, bars A are joined by a member C that forms the lower portion of a casing inclosing the driving gear of the vehicle. The general outline as well as the details of construction of such gear case member C appear in Figs. 3 and 4. The member is attached to the respective bars by means of laterally projecting ears $c$ on either side. The upper member $C'$ of the casing, it is thus seen, will lie between the two bars, being removably secured to the lower member at each end by means of short bolts or screws passing through registering ears $c^2$ on the respective members.

Lower member C is provided with two sets of alined bearings $c^3$ and $c^4$, formed integrally therewith. Of these the rearmost $c^3$ is designed to receive the rear axle $C^2$ of the car, while in the other is journaled a short spindle or shaft $c^4$. The gear mechanism, which of course is wholly included within the casing when the two members of the latter are brought together, comprises a pinion $C^3$, that is rotatively mounted upon rear axle $C^2$, and a driving gear $C^5$ that meshes with such pinion and is similarly mounted upon spindle $c^4$. Upon the rear axle, which it is thus seen is a live axle, are mounted the rear wheels D, only one of which, however, should be rotatively secured thereto, since otherwise difficulty would be experienced in turning the car, due to the absence of any differential gearing. On the respective ends of spindle $c^4$, such ends projecting a slight distance beyond bearings $c^3$, are mounted crank-arms $c^6$ by means of which the rear axle may be rotated through the intermediate gear. To actuate such crank arms the usual hand lever $C^6$ is pivotally mounted between the two bars A. Operative connection between such lever and crank arms $c^6$ is effected by means of a rod $C^7$ of general V-shape. This rod is pivotally secured at its apex to the front side of the lower end of hand lever $C^6$ by means of a clip $c^7$; and the extremities of its arms $c^8$ are bent inwardly to engage suitable apertures therefor provided in crank arms $c^6$. The operation of the foregoing mechanism should be, it is thought, self-evident. The seat A' of the car is supported upon two longitudinal trusses $a$ that in turn rest upon the parallel coupling bars A.

As has been indicated, the forward running gear construction is most clearly shown in Figs. 5, 6, and 7. Such construction comprises a bearing-plate $b$, shown by itself in Fig. 7, that is centrally mounted upon the front truck which here consists simply of an axle B' with attached wheels D'. Bolster B is provided with another plate $b'$, preferably integral therewith, that rests upon such bearing-plate $b$. Bolster plate $b'$ is formed, Fig. 6, with a central aperture $b^2$ comprising two segmental portions of different radii as there shown; and bearing-plate $b$ is provided on its upper side with a short pin $b^3$ that is adapted to fit in the portion of aperture $b^2$ having the shorter radius, and that is formed with a lateral projection or arm $b^4$ extending into the larger portion of such aperture. The length of this pin $b^3$ is substantially equal to the thickness of plate $b'$ so that its end lies flush with the upper surface of the plate. A washer $b^5$ entirely covers aperture $b^2$ and pin $b^3$ and a bolt $b^6$ passing through axle B, plate $b$ and pin $b^3$, and this washer serves to firmly secure the bolster to the truck.

From the construction just set forth it will be obvious that turning of the front truck will not be possible through an angle greater than the arc covered by the segmental portion of aperture $b^2$ having the greater radius; for the turning of arm $b^4$ of pin $b^3$ is limited in either direction by the sides of such aperture. Some sort of device for effecting this result is quite necessary, for, inasmuch as the hands are occupied in operating the propelling mechanism, the feet must be utilized to steer the car, and accidents would be apt to occur were not means provided preventing the wheels from being caught under the coupling-bars A. Clips $b^7$ on axle B' form convenient rests for the feet of the driver and guard them from becoming caught in the wheels, when thus used in steering. It is thus seen that our improved hand-car involves a number of features that commend it both to the maker and to the prospective juvenile driver. The driving gear mounting involves a minimum number of readily assembled parts and at the same time insures the maintenance of a perfect alinement between pinion $C^3$ and gear $C^5$. Such gearing is furthermore entirely inclosed, thereby keeping out dust and dirt and permitting thorough lubrication, which would otherwise be objectionable owing to the liability of the clothes of the user becoming soiled. The advantages secured by the forward running gear construction that we have devised to meet the difficulties heretofore encountered in steering this class of vehicles. have already been fully set forth.

Having thus described our invention in detail, that which we particularly point out and distinctly claim, is:

1. In vehicle running gear, the combination with the front axle, of a bearing-plate mounted thereon, and a bolster provided with a plate adapted to rest on aforesaid bearing-plate, one of said plates being provided with an aperture consisting of two concentric segmental portions having unequal radii, and the other of said plates being provided with a pin fitting in the smaller portion of said aperture and provided with an arm extending into the larger portion thereof.

2. In vehicle running gear, the combination with the front axle, of a bearing-plate mounted thereon, and a bolster provided with a plate adapted to rest on aforesaid bearing-plate, one of said plates being provided with an aperture and the other thereof with a lug registering in said aperture, such aperture being formed to permit said pin a limited amount of rotation therein only.

3. In vehicle running gear, the combination with the front axle, of a bearing-plate mounted thereon, a bolster provided with a plate adapted to rest on aforesaid bearing plate, the upper of said plates being provided with an aperture consisting of two concentric segmental portions having unequal radii and the lower thereof being provided with a pin fitting in the smaller portion of said aperture and provided with an arm extending into the larger portion thereof, and means for securing said upper and said lower plates together.

4. In vehicle running gear, the combination with the front axle, of a bearing-plate mounted thereon, a bolster provided with a plate. adapted to rest on aforesaid bearing plate, the upper of said plates being provided with an aperture consisting of two concentric segmental portions having unequal radii and the lower thereof being provided with a pin fitting in the smaller portion of said aperture and provided with an arm extending into the larger portion thereof, and means for securing said upper and said lower plate together, such means comprising a washer covering such aperture and pin and a bolt passing through said washer and said lower plate.

Signed by us this 12th day of June 1906.

SAMUEL D. LATTY.
HENRY T. LATTY.

Attested by—
G. W. SAYWELL
JNO. F. OBERLIN.